United States Patent [19]
Jasinski

[11] Patent Number: 5,878,644
[45] Date of Patent: Mar. 9, 1999

[54] PIVOTABLE CARRIAGE VERTICAL BAND SAW MACHINE

[75] Inventor: Chris F Jasinski, Embro, Canada

[73] Assignee: Hyd-Mech Group Limited, Woodstock, Canada

[21] Appl. No.: 819,514

[22] Filed: Mar. 17, 1997

[51] Int. Cl.[6] .......................... B23D 53/04; B27B 13/00; B26D 1/46
[52] U.S. Cl. ................... 83/812; 83/794; 83/801; 83/817; 83/452; 83/454; 83/581; 83/647
[58] Field of Search ................. 83/794, 809–813, 83/454, 452, 456, 455, 820, 464, 461, 581, 581.1, 817, 647, 488, 801, 466, 462, 646

[56] References Cited

U.S. PATENT DOCUMENTS

| | | | |
|---|---|---|---|
| 2,806,490 | 9/1957 | Kennedy | 83/811 X |
| 3,034,387 | 5/1962 | Sebastian | 83/820 X |
| 3,474,693 | 10/1969 | Wilkie et al. | 83/801 |
| 3,801,089 | 4/1974 | Fukugami et al. | 83/794 X |
| 3,851,557 | 12/1974 | Vierstraete | 83/461 |
| 3,853,028 | 12/1974 | Jagers | 83/461 |
| 3,862,583 | 1/1975 | Tsuchiya | 83/796 |
| 3,884,106 | 5/1975 | Aizawa | 83/581 X |
| 3,952,622 | 4/1976 | Majus | 83/811 X |
| 4,503,743 | 3/1985 | Ryba | 83/811 X |
| 4,658,689 | 4/1987 | Yakich | 83/801 |
| 5,203,247 | 4/1993 | D'Arcy | 83/794 |
| 5,320,016 | 6/1994 | Spath et al. | 83/801 |
| 5,415,069 | 5/1995 | Collins et al. | 83/820 X |
| 5,526,727 | 6/1996 | Richards et al. | 83/798 |

FOREIGN PATENT DOCUMENTS

| | | | |
|---|---|---|---|
| 1126624 | 6/1982 | Canada | 83/812 |
| 1455175 | 11/1976 | United Kingdom | 83/810 |

*Primary Examiner*—Rinaldi I. Rada
*Assistant Examiner*—Boyer Ashley
*Attorney, Agent, or Firm*—David P. Gordon; David S. Jacobson; Thomas A. Gallagher

[57] ABSTRACT

A vertical band saw machine in which a carriage assembly is mounted for pivoting on a base by rotational pivot points. Pivoting of the carriage assembly enables the band saw machine to make miter cuts to a workpiece. The head frame of the band saw machine travels on a guide on the carriage assembly and moves only in the direction of the plane of cut. A vise assembly is preferably attached to the carriage assembly and pivots with the carriage assembly for keeping the vise assembly close to the line of cut at all times, regardless of carriage assembly orientation. A driving wheel and driven wheel are attached to the head frame and may be tilted with respect to the head frame.

20 Claims, 5 Drawing Sheets

PIVOTABLE CARRIAGE VERTICAL BAND SAW MACHINE

FIELD OF THE INVENTION

The present invention relates to cutoff saw machines, and more particularly to vertical hand cutoff saw machines.

BACKGROUND OF THE INVENTION

Band sawing is the process of cutting by carrying an endless band saw blade on a head frame assembly comprising a driving wheel and a driven wheel. The wheels are displaced and substantially vertically arranged on the head frame assembly.

A vertical band saw machine can be used for making mitered cuts to a workpiece by pivoting the head frame assembly in relation to the feed direction of the material to be sawed. The head frame assembly is pivotable, preferably at the cut point of the workpiece, located on a workable between the wheels. The driving wheel is preferably electrically powered. Power is provided to the driving wheel through a gear box to reduce band saw blade speed.

In previous known band saw machines, ahead frame assembly is pivotally connected to a translating carriage assembly for making miter cuts. Typically, the carriage assembly which supports the head frame is rail mounted. The workpiece is held stationary as the band saw blade is carried through the material by the translating carriage assembly on the rail. The carriage is translated at a selected feed rate depending on the material being cut.

Further, a clamping device is typically mounted on the worktable of the band saw machine and consists of a fixed vise jaw and moveable vise jaw. The vise jaws are limited in dimension so that they do not interfere with the band saw blade when making mitered cuts.

Several examples of known band saw machines are disclosed in U.S. Pat. No. 4,658,689 "Vertical Band Saw with Cantilever Frame" by John L. Yakich issued on Apr. 21, 1987. U.S. Pat. No. 5,320,016 "Vertical Band Saw" by Dieter Spath et al. issued on Jun. 14, 1994; U.S. Pat. No. 5,526,727 "Bandsaw Apparatus with Pivotally-Mounted Saw Head Assembly Arm and Method" by Mark P. Richards et al. issued on Jun. 18, 1996; and U.S. Pat. No. 5,203,247 "Vertical Mitering Band Saw" by John W. D'Arey issued on Apr. 20, 1993.

SUMMARY OF THE INVENTION

In accordance with an aspect of the present invention, there is provided a vertical bandsaw comprising: an upstanding base; a carriage assembly comprising first and second opposing end portions, and a guide extending between the end portions; a head frame assembly, comprising vertically spaced drive and driven wheels; and an endless bandsaw blade extending between the spaced wheels, defining a cutting region in a generally upwardly extending cutting plane. The head frame assembly is slidably mounted to the carriage assembly for linear movement of the cutting region and of the head frame assembly on the guide in a generally forward and backward direction from and toward the end portions. The carriage assembly is pivotally mounted to the base to permit tilting of the carriage assembly, the head frame assembly and the cutting plane relative to the base to permit mitered cutting of a workpiece. A vise assembly is on the carriage assembly, proximate one of the end portions, tiltable with the carriage assembly relative to the base. The vise assembly comprises a fixed jaw and a moveable jaw, moveable away and toward the fixed jaw. The vise assembly is adapted to retain a workpiece on a path of the cutting region as the head frame assembly is moved on the guide between the end portions.

In accordance with another aspect of the present invention, there is provided a vertical bandsaw comprising: a base; a head frame assembly, comprising vertically spaced drive and driven wheels; and an endless bandsaw blade extending between the spaced wheels and defining a cutting region in a generally upwardly extending plane; means for retaining a workpiece on the base; means for guiding the head frame assembly and the cutting region for linear movement on the base toward and away from the means for retaining and for pivoting the head frame assembly relative to the base to permit mitered cutting of the workpiece on the means for retaining; and means for driving the drive wheel.

In accordance with yet a further aspect of the present invention, there is provided a vertical bandsaw comprising: a base; a carriage assembly comprising a body and a longitudinally extending guide extending on the body; a head frame comprising spaced drive and driven wheels and an endless bandsaw blade extending between the spaced wheels. The head frame is slidably mounted on the guide and the carriage assembly is pivotally mounted to the base for pivoting of the carriage assembly and the head frame about a pivot axis parallel to a longitudinal extent of the guide. A workpiece mount is on the base and is adapted to retain a workpiece on a path of the bandsaw blade as the head frame is slid along the guide.

In accordance with yet a further aspect of the present invention there is provided a vertical bandsaw comprising: a base; a carriage assembly mounted to the base; a longitudinally extending guide supported by the carriage assembly; a head frame comprising spaced drive and driven wheels and an endless bandsaw blade extending between the spaced drive and driven wheels. The head frame is slidably mounted on the guide. The carriage assembly is pivotally mounted to the base to pivot about a pivot axis parallel to a longitudinal extent of the guide to permit pivoting of the guide and head frame. A workpiece mount adapted to retain a workpiece on a path of the bandsaw blade as the head frame is slid along the guide, is interconnected with the carriage assembly to pivot about the axis with the carriage assembly.

Advantageously, the carriage assembly pivotally mounts on a base at rotational pivot points. This simplifies the production of the band saw machine, reduces required floor space by eliminating the need for triangulation of a head frame assembly to a conventional carriage assembly, counteracts unbalanced forces, and provides the head assembly with more rigidity, thus reducing vibration. Pivoting of the carriage assembly allows for mitering cuts of the workpiece.

Further, a vise assembly that is capable of pivoting together with the carriage assembly preferably forms part of the bandsaw. It permits making mitering cuts in the workpiece while keeping the vise assembly always in close proximity to the band saw blade which further reduces vibration. Such vise assembly is mounted on the carriage assembly and therefore pivots with the carriage assembly.

Further, the band saw wheels are preferably tilted with respect to the head frame column. This configuration may provide several advantages. For example, the movable band saw guide has more room to pivot with the carriage assembly and interference between the vise assembly and movable band saw guide is eliminated. The twist length of the band saw blade can be shortened by placing the fixed band saw guide closer to the bottom wheel because twisting stress on the band saw blade is lessened. The band saw machine can therefore be more compact and still remain functional.

In a preferred embodiment of the invention the driving wheel is powered by electrical means and power is translated to the driving wheel by the use of a gear box.

Other objects and advantages will become apparent from the detailed description of the preferred embodiment which will follow.

DETAILED DESCRIPTION OF THE DRAWINGS

In Figures, which illustrate a preferred embodiment of the present invention.

DETAILED DESCRIPTION

Figure 1:
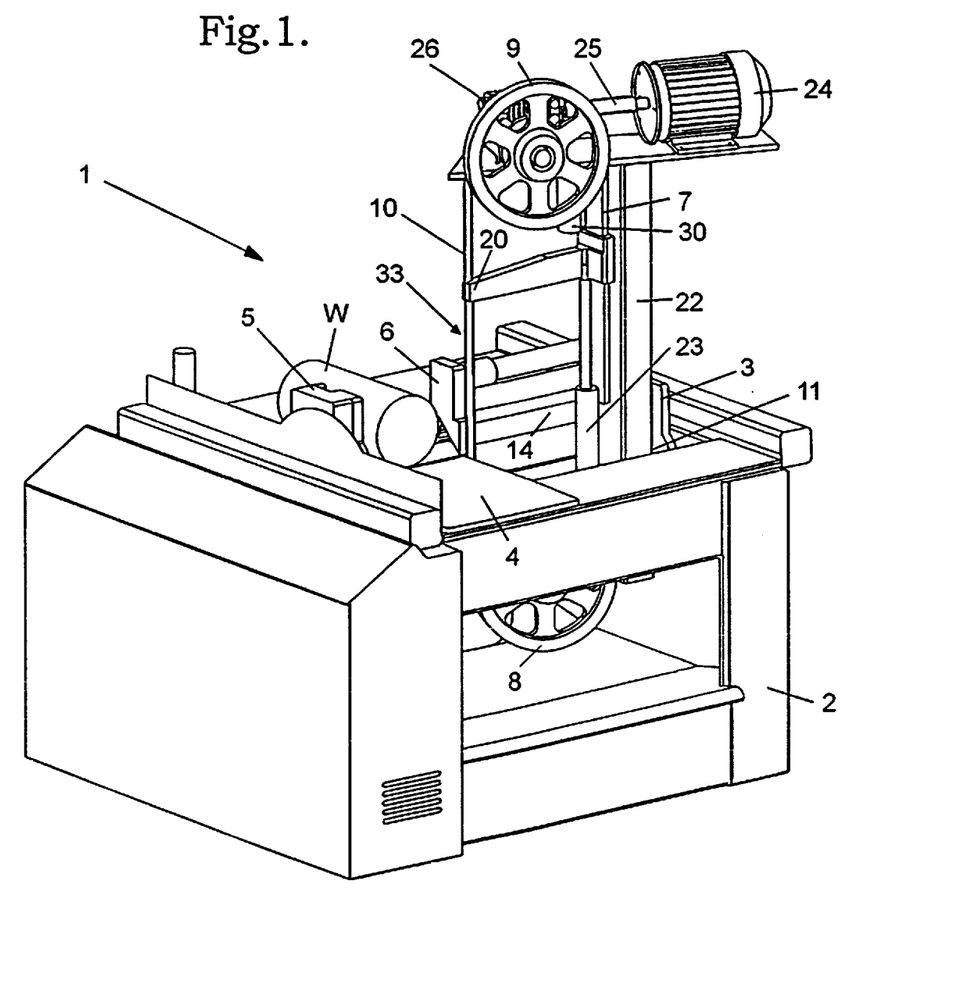
FIG. 1 is a perspective view of a band saw machine embodying the features of the present invention.
Figure 4:
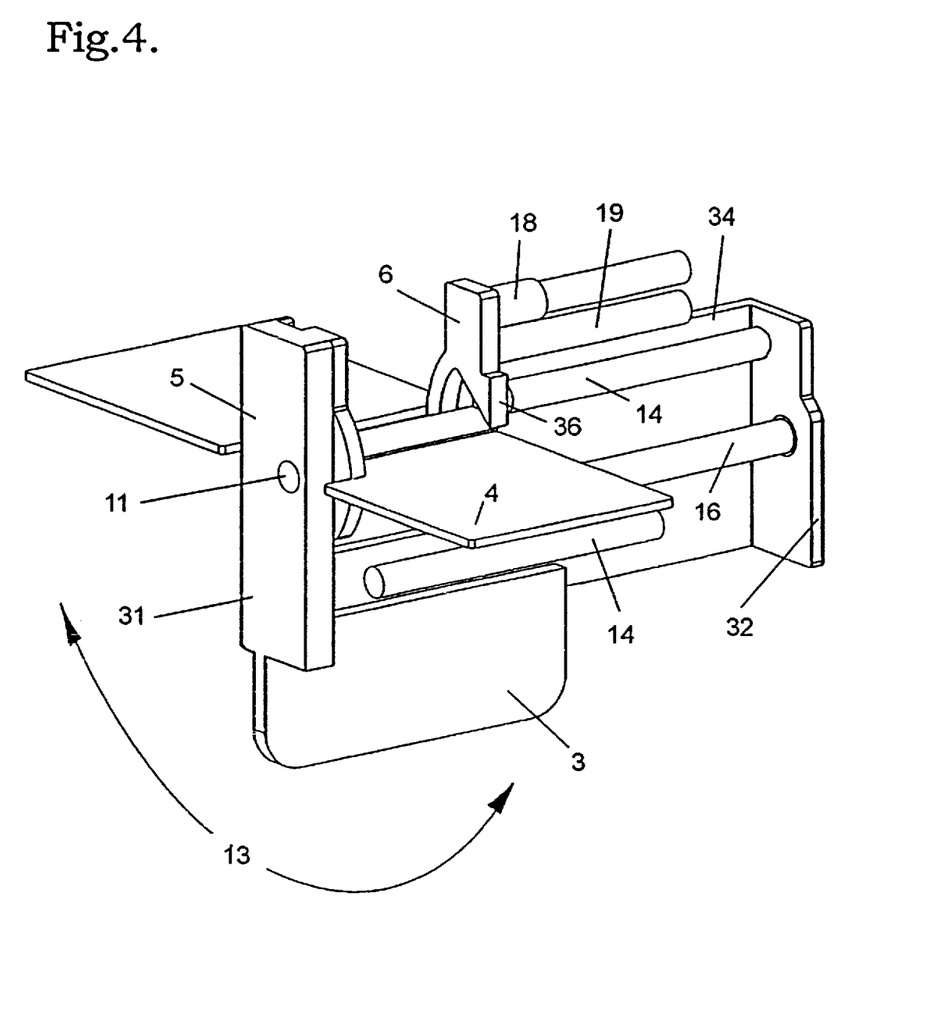
FIG. 4 is a close up view of a vise assembly mounted to the carriage assembly, forming part of the band saw machine of FIG. 1.

Referring to FIG. 1 of the drawings, a vertical type pivotable carriage band saw machine 1 exemplary of a preferred embodiment of the present invention. Band saw machine 1, comprises a base 2 onto which a carriage assembly 3 is pivotally mounted. A workable 4 for supporting a workpiece W, and fixed and movable workpiece vise jaws 5,6 are attached to the carriage assembly 3 for clamping the workpiece W. A head frame 7 is driven on the carriage assembly 3. Guide rails 14 form part of the carriage assembly 3 and extend between end portions 31 and 32, of body 34 as best illustrated in FIG. 4. The head frame 7 carries two wheels, a driven wheel 8 and a driving wheel 9. Driving wheel 9 is powered by an electric motor 24. The driven wheel 8 and driving wheel 9 are vertically spaced and carry a band saw blade 10 thereby defining a cutting region 33 between the wheels 8 and 9.

Figure 2:
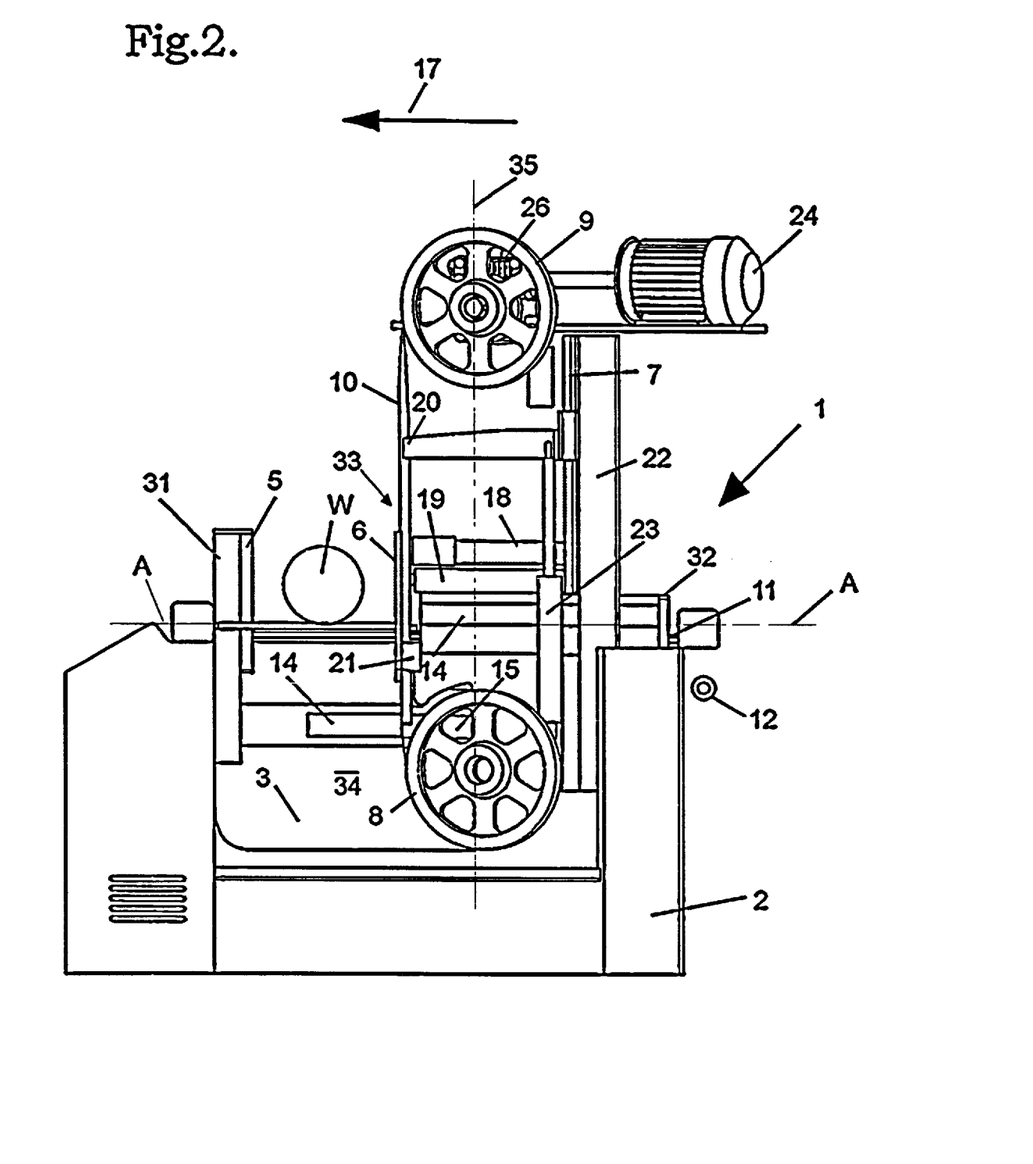
FIG. 2 is a side elevation of the band saw machine of FIG. 1, showing the carriage assembly, head frame and base.
Figure 3:
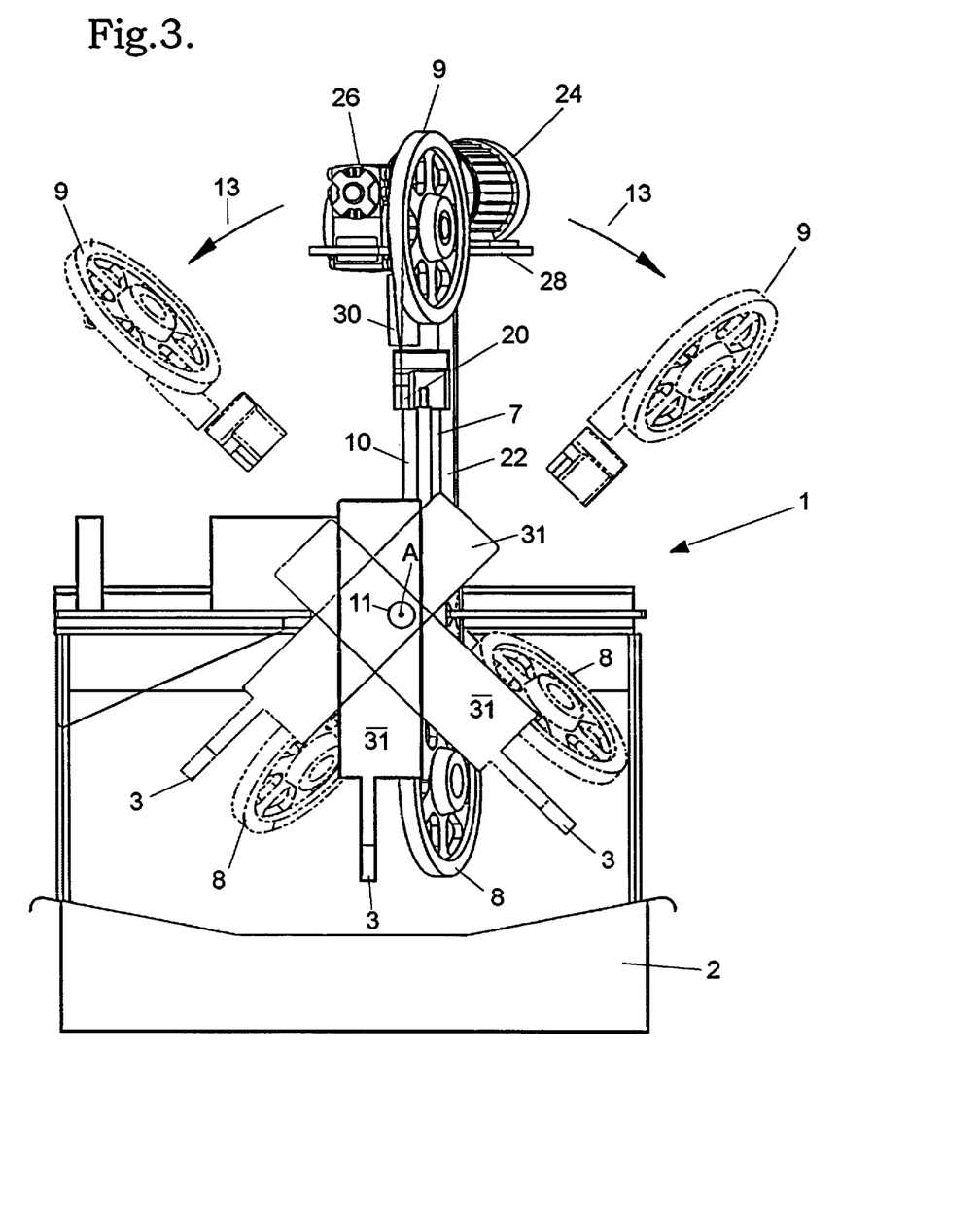
FIG. 3 is a front elevation of the band saw machine of FIG. 1, showing the base, carriage assembly and head frame pivoted in three positions.

As illustrated in FIGS. 2 and 3, the pivotable carriage assembly 3 is attached to the base 2 and is pivotable about an axis. A described by the intersection of the plane of cut and the plane of the worktable 4 thus allowing for miter cutting of a workpiece W. The carriage assembly 3 is mounted onto the base 2 at rotational pivot points 11. A carriage swing cylinder 12, which is attached to the carriage assembly 3 at one end and the base 2 at the other end, pivots the carriage assembly 3 in various angular orientations. The carriage assembly 3 is operatively connected to base 2 for selectively fixing the pivoted carriage assembly 3 at various angular orientations. The carriage assembly 3 is pivotable in the direction of arrow 13.

As illustrated in FIG. 2, the head frame 7 carrying the band saw blade 10 may be driven on the carriage assembly 3 by head frame cylinder 16, illustrated in FIG. 4. This enables the band saw blade 10 to move through the workpiece W. The workpiece W may thus be cut in a plane substantially in the direction of head frame 7 advance. The head frame 7 is mounted on head frame guide rails 14 which form part of the carriage assembly 3 and extend between the rotational pivot points 11. The head frame guide rails 14 also pass through head frame guide blocks 15 which are attached to the head frame 7. As illustrated, at least one head frame guide block 15 is located between the centers of wheels 8,9 (connected by dotted line 35) and the cutting edge of band saw blade 10. The head frame 7 therefore, need only move along the line of cut to perform any cutting operation. The head frame 7 travels in the direction indicated by arrow 17.

As illustrated in FIG. 4, the vise assembly 5,6 is attached to the carriage assembly 3 and the vise assembly 5,6 is pivotable with the carriage assembly 3. A workpiece W is supported by a worktable 4 and is clamped in place for cutting with the band saw blade 10 by a fixed vise jaw 5 and a movable vise jaw 6 which are attached to the carriage assembly 3. Moveable vise jaw 6 comprises an unrelieved edge 36 most proximate the cutting edge of band saw blade 10 (FIG. 1), as the band saw blade 10 is advance toward workpiece W. The fixed vise jaw 5 remains stationary with respect to the carriage assembly 3 and the movable vise jaw 6 is guided by a vise guide 18 and translates in a direction parallel to the translational movement of the head frame 7 by means of a vise cylinder 19 to hold fast a workpiece W. The faces of the fixed and movable vise jaws 5,6 that make contact with the workpiece W lie in parallel planes. The band saw blade 10 illustrated in FIGS 1–3 is shown at close proximity to the vise assembly 5,6. This distance always remains constant, as the headframe is pivoted as illustrated in FIG. 3, because the vise assembly 5,6 is attached to the carriage assembly, regardless of the pivoted orientation of the carriage assembly 3. This further reduces vibration of the workpiece W and band saw blade 10 by providing additional support at the line of cut. Moreover, it enables the workpiece W to be held near the line of cut, thus allowing for the cutting of smaller sections of the workpiece W.

Referring to FIG. 2, band saw guides 20,21 serve for twisting the band saw blade 10 into the appropriate cutting plane. The band saw blade 10 is twisted to a position perpendicular to a workpiece W to be cut by a pair of the band saw guides 20,21. The band saw guides 20,21 are fastened to the head frame 7. Band saw guide 20 is moveable, being adjustable and securable in the running direction of the band saw blade 10 on a support column 22 near the head frame. Band saw guide 21 is stationary and affixed to the support column 22 of the driven wheel 8 and below the worktable. Therefore, it can be said that both band saw guides 20,21 allow for close adjustment with respect to the sides of the workpiece W. The movable band saw guide 20 is vertically displaceable on the column 22 and is fixable by a band saw guide cylinder 23 or by conventional means. The band saw guides 20,21 are always parallel to the head frame guide rails 14.

Figure 5A:
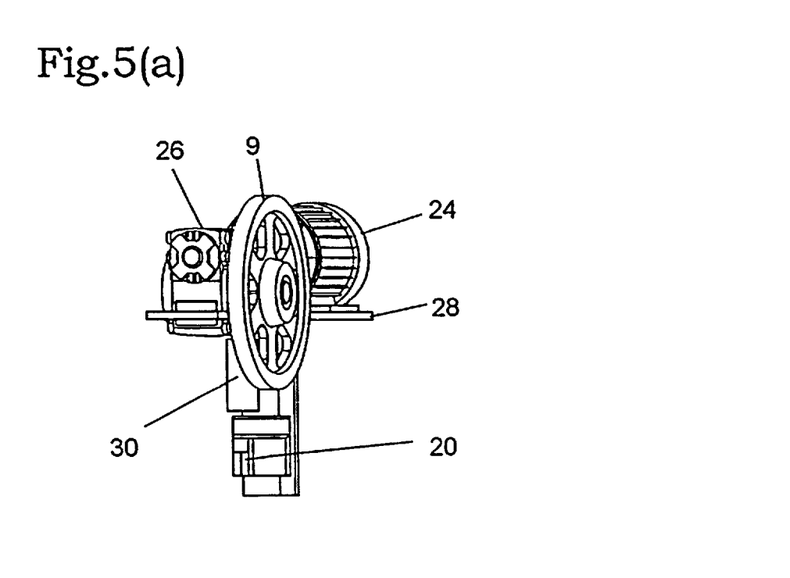
FIG. 5(a) is a front view of a portion of a head frame assembly forming part of the band saw machine of FIG. 1.

Referring to FIG. 5(a) the axis of the wheel 8,9 is inclined relative to the head frame 7 so that at the back of the band saw blade 10, does not make contact with guides 20 and 21. Guides 20,21 twist the cutting edge of the band saw blade 10 perpendicular to the longitudinal axis of the workpiece W and in close proximity to the top and bottom of the workpiece W.

Figure 5B:
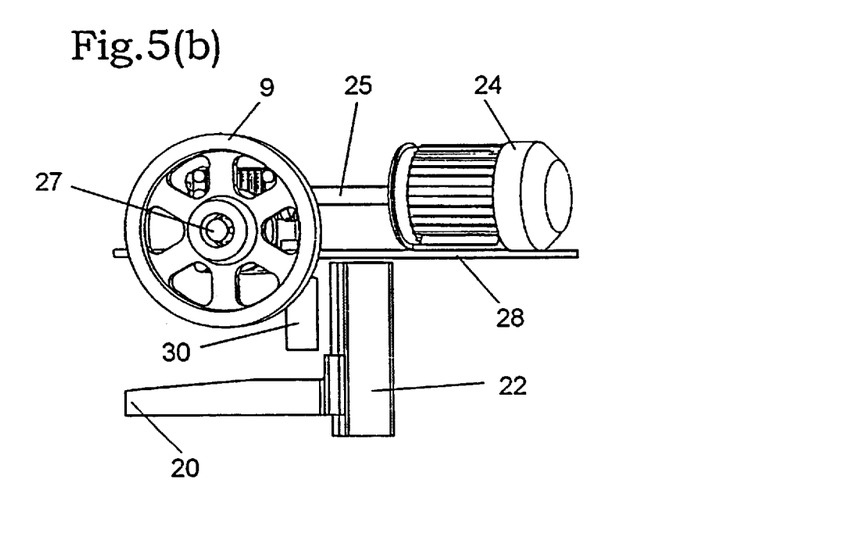
FIG. 5(b) is a side view of FIG. 5(a).

With reference to FIGS. 5(a) and 5(b), to make a cut, the driving wheel 9 is made to rotate by electric motor 24, coupled to the input shaft 25 of a gear box 26 which reduces the speed of rotation of the output shaft 27. The driving wheel 9 is mounted on the output shaft 27. The motor 24 is supported by the motor mounting 28. The driving wheel 9 and driven wheel 8, by rotating, cause the band saw blade 10 to move in a cyclical motion. Carbide pads (not shown)

clamp the band saw blade 10 and hold it rigidly to provide consistency in cutting operations.

The band saw blade 10 is trained over the driven wheel 8 and driving wheel 9. The band saw blade 10 is kept taut by adjusting the vertical distance between the wheels 8,9 using tension cylinder 30 or other conventional means.

It is evident that though this is the preferred embodiment of the invention, the specific design of the band saw machine may be altered within the scope of this invention and as defined by the following claims.

I claim:

1. A vertical bandsaw comprising:
    an upstanding base;
    a carriage assembly comprising first and second opposing end portions, and a guide extending between said end portions;
    a head frame assembly, comprising
        vertically spaced drive and driven wheels; and
        an endless bandsaw blade extending between said spaced wheels, defining a cutting region in a generally upwardly extending cutting plane;
    said had frame assembly slidably mounted to said carriage assembly for linear movement of said cutting region and of said head frame assembly on said guide in a generally forward and backward direction from and toward said end portions;
    said carriage assembly pivotally mounted to said base to permit tilting of said carriage assembly, said head frame assembly and said cutting plane relative to said base to permit mitered cutting of a workpiece;
    a vise assembly on said carriage assembly, proximate one of said end portions, tiltable with said carriage assembly relative to said base;
    said vise assembly comprising a fixed jaw and a moveable jaw, moveable away and toward said fixed jaw, said vise assembly adapted to retain a workpiece on a path of said cutting region as said head frame assembly is moved on said guide between said end portions.

2. The vertical bandsaw of claim 1, further comprising a generally horizontal workpiece support on said base, extending between said fixed and moveable jaw to support a workpiece retained by said vise assembly.

3. The vertical bandsaw of claim 1, wherein said guide comprises first and second parallel rails extending between said end portions.

4. The vertical bandsaw of claim 1, wherein said guide comprises a guide rail and said head frame assembly comprises a guide block, said guide block engages said guide rail and said guide block is located on said head frame assembly at a lateral position ahead of centre of said drive wheel as said cutting region is moved toward said vise assembly.

5. The vertical bandsaw of claim 1, further comprising a carriage swing cylinder attached between said carriage assembly and said base for pivoting said carriage assembly to various angular positions relative to said base.

6. The vertical band saw of claim 1, wherein said moveable vise jaw is moveable in a direction generally parallel to sliding of said head frame assembly.

7. The vertical band saw of claim 6, wherein said moveable vise jaw comprises an upstanding unrelieved edge most proximate said cutting region, said unrelieved edge parallel to said plane.

8. The vertical bandsaw of claim 1, wherein
    said carriage is pivotally mounted about an axis;
    said head frame assembly extends upwardly on one side of said axis; and
    said carriage assembly extends downwardly on another side of said axis to counterbalance pivot of said head frame assembly about said axis.

9. The vertical bandsaw of claim 8, further comprising a motor interconnected with said drive wheel for rotating said drive and driven wheel.

10. The vertical bandsaw of claim 9, wherein said motor is mounted to said head frame assembly above said axis.

11. A vertical bandsaw comprising:
    a base;
    a carriage assembly comprising a body and a longitudinally extending guide extending on said body;
    a head frame comprising spaced drive and driven wheels and an endless bandsaw blade extending between said spaced wheels, said head frame slidably mounted on said guide;
    said carriage assembly pivotally mounted to said base for pivoting of said carriage assembly and said head frame about a pivot axis parallel to a longitudinal extent of said guide;
    a workpiece mount on said base adapted to retain a workpiece on a path of said bandsaw blade as said head frame is slid along said guide.

12. The vertical bandsaw of claim 11, wherein said guide comprises a guide rail and said head frame assembly comprises a guide block, engaging said guide rail said guide block located on said head frame assembly located at a lateral position ahead of a centre of said drive wheel as said cutting region is moved toward said workpiece mount.

13. The vertical bandsaw of claim 11, wherein
    said head frame extends upwardly on one side of said axis; and
    said carriage assembly extends downwardly on another side of said axis to counterbalance pivot of said head frame about said axis.

14. The vertical bandsaw of claim 11, wherein said guide comprises first and second parallel rails extending on said body.

15. The vertical bandsaw of claim 11, wherein said workpiece mount comprises a vise assembly.

16. The vertical bandsaw of claim 15, further comprising a generally horizontal workpiece support on said base, extending between said fixed and moveable jaw to support a workpiece retained by said vise assembly.

17. The vertical bandsaw of claim 15, wherein sad vise assembly comprises a fixed jaw and a moveable jaw, moveable away from and toward said fixed jaw for retaining a workpiece.

18. The vertical bandsaw of claim 17, wherein said vise assembly is on said carriage assembly, pivotable with said carriage assembly relative to said base.

19. The vertical band saw of claim 18, wherein said moveable vise jaw comprises an edge closest to said bandsaw blade as said head frame is slid toward said workpiece on said path, that remains generally parallel to a cutting edge of said band saw blade, as said carriage assembly is pivoted about said axis.

20. A vertical bandsaw comprising:
    a base;
    a carriage assembly mounted to said base;
    a longitudinally extending guide supported by said carriage assembly;
    a head frame comprising spaced drive and driven wheels and an endless bandsaw blade extending between said space drive and driven wheels;

said head frame slidably mounted on said guide;

said carriage assembly pivotally mounted to said base to pivot about a pivot axis parallel to a longitudinal extent of said guide to permit pivoting of said guide and said head frame;

a workpiece mount adapted to retain a workpiece on a path of said bandsaw blade as said head frame is slid along said guide, and interconnected with said carriage assembly to pivot about said pivot axis with said carriage assembly.

* * * * *

UNITED STATES PATENT AND TRADEMARK OFFICE
CERTIFICATE OF CORRECTION

PATENT NO. : 5,878,644
DATED : March 9, 1999
INVENTOR(S) : Chris F. Jasinski

It is certified that error appears in the above-indentified patent and that said Letters Patent is hereby corrected as shown below:

Claim 1, line 11, replace "had" with --head--.

Claim 4, line 5, insert --a-- between "ahead of" and "centre".

Claim 17, line 1, replace "sad" with --said--.

Signed and Sealed this

Twenty-second Day of May, 2001

Attest:

NICHOLAS P. GODICI

Attesting Officer     Acting Director of the United States Patent and Trademark Office